US007378964B1

(12) United States Patent
Amir et al.

(10) Patent No.: US 7,378,964 B1
(45) Date of Patent: May 27, 2008

(54) VERY LOW POWER ACTIVE RFID RECEIVER

(76) Inventors: Israel Amir, 32 Flemming Way, Princeton, NJ (US) 08540; Karuppiah Annamalai, 35 Ludlow Rd., Yardley, PA (US) 19067

( * ) Notice: Subject to any disclaimer, the term of this patent is extended or adjusted under 35 U.S.C. 154(b) by 218 days.

(21) Appl. No.: 11/194,202

(22) Filed: Aug. 1, 2005

Related U.S. Application Data

(63) Continuation of application No. 11/190,400, filed on Jul. 27, 2005.

(60) Provisional application No. 60/677,594, filed on May 4, 2005.

(51) Int. Cl.
*G08B 1/08* (2006.01)
*G08B 13/12* (2006.01)
*G08B 5/22* (2006.01)
*H04Q 7/00* (2006.01)

(52) U.S. Cl. ............................ 340/539.32; 340/636.1; 340/568.1; 340/825.36; 340/7.32; 340/7.33

(58) Field of Classification Search .................... None
See application file for complete search history.

(56) References Cited

U.S. PATENT DOCUMENTS

RE35,364 E * 10/1996 Heitschel et al. ............. 700/90
7,256,726 B2 * 8/2007 Bejean ....................... 341/176
2006/0142052 A1 * 6/2006 Lai et al. ................. 455/552.1

* cited by examiner

*Primary Examiner*—Julie Lieu
(74) *Attorney, Agent, or Firm*—Henry Brendzel

(57) ABSTRACT

A receiver includes two receiving modules, where the first receiving module is extremely parsimonious on battery power and as long as it is successful in developing a proper output signal at a given port maintains the second receiving module off, or substantially off. When the signal output of the first module drops below a preselected output, the second receiving module is enabled to develop and apply an output signal to the given port.

15 Claims, 3 Drawing Sheets

VERY LOW POWER ACTIVE RFID RECEIVER

RELATED APPLICATIONS

This application claims priority from U.S. Provisional application No. 60/677,594 filed May 4, 2005, and it is also a continuation of a U.S. application Ser. No. 11/190,400 filed 27 Jul., 2005, both of which are hereby incorporated by reference.

BACKGROUND

This invention relates to wireless transmission and reception, and more particularly to transmitters and corresponding receivers that are characterized by extremely low average power consumption but which, nevertheless, possess high selectivity.

Numerous objects have nowadays become an integral part of almost everybody's life. Aside from keys, wallet and purses, which have been common for years, many people now carry a cellphone, and often other electronic appliances. A lost cellphone represents a significant loss both because much functionality is included into the cellphone, and because the cost of a replacement phone is quite high. Alas, it is the nature of oft-used small portable objects that they are casually put aside and, consequently, the user sometimes forgets to take the object along as the user walks away, or forgets where the user put down the object. Consequently the "misplaced" object is either found after some effort and associated consternation, or is truly lost. Also, unfortunately, sometimes such objects are actually stolen.

It would be beneficial to overcome this problem with, for example, a low cost, low power consumption, miniature size, proximity sensor that alarms a user that his/her electronic appliance or other valuable (such as luggage, wallet, purse etc.) is left behind.

Therefore, it is a primary objective of this invention to alert a user within a reasonable time when an object that is normally in close physical proximity of the user is outside an expected proximity of the user.

Another objective of this invention is that whatever is done to the object, such as to modify it or to attach something to it encumbers the object in a de minimis manner.

Still another objective is for provide a solution that presents an extremely low current drain on whatever supplies the operating power to the device that achieves the primary objective.

Yet another objective is to make it unlikely that an alert would be erroneously sounded, such as resulting from interferences by other devices.

Furthermore, it is an objective to create a system where more than one object can be tracked by a single device.

SUMMARY

These and other objectives are realized with an arrangement that comprises one device that is a receiver, and one or more devices that are transmitters. A transmitter is attached to the user's object or is a part thereof, and the receiver serves as the monitoring/tracking device that that the user employs. A transmitter/receiver pair operates by the transmitter outputting a repeating pattern of a short burst followed by a long sleep interval. The receiver advantageously includes two receiving modules, where the first receiving module is extremely parsimonious on battery power and as long as it is successful in developing a proper output signal maintains the second receiving module off, or substantially off. When the signal output of the first module drops below a preselected output, the second receiving module is enabled.

DETAILED DESCRIPTION

Figure 1:
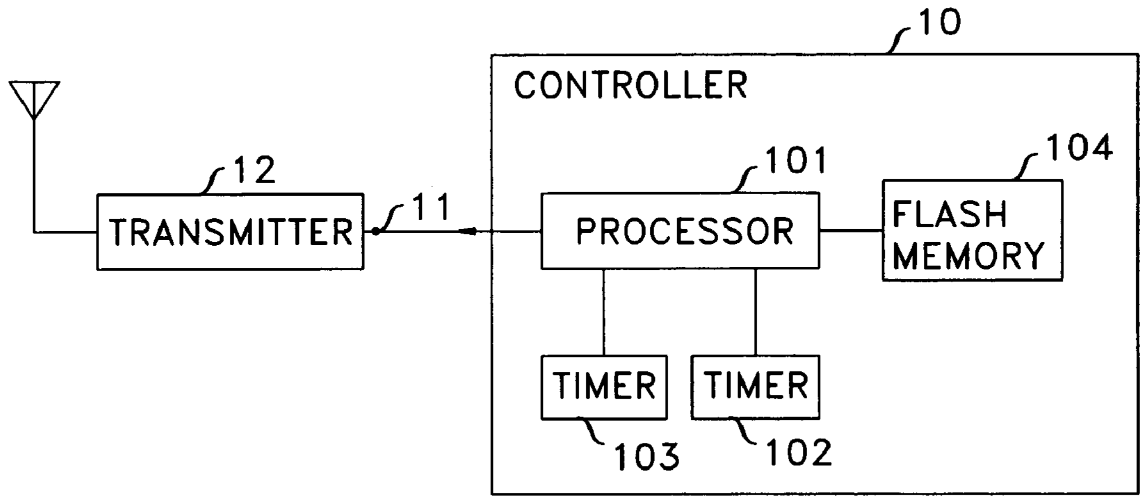
FIG. 1 depicts a block diagram of a transmitter of a first embodiment in accord with the principles disclosed herein.

A measure of protection for a user object/appliance, such as a cellphone or keys, is achieved by effectively having the user object communicate, basically continuously, with a monitoring/tracking device. When such communication ceases, the monitoring/tracking device sounds an alarm. More particularly in accord with the principles disclosed herein, protection is achieved by having a first electronic device permanently attached to the user object/appliance (generically, henceforth, "appliance") and having a second, alarm-sounding electronic device in possession of the user. The first and second electronic devices form a transmitter/receiver pair. When the appliance is an electronic device, for example, a cellphone, the first electronic device may be an embedded module within the appliance.

Illustratively, the first electronic device is a transmitter, and the second, alarm-sounding, device is a receiver.

Clearly, in order for this protection arrangement to be commercially successful, it must be extremely small. When the transmitter is a separate and distinct electronic device that is attached to a cellphone, it must not make the cellphone more cumbersome, or appreciably increase its weight. Correspondingly, the alarm-sounding device ought to be small and convenient to carry on the user's person at all times. Additionally, in order to sustain communication between the transmitter/receiver pair at all times, the power consumption of such communication must be extremely small, at least in the alarm-sounding device, and in devices that are attached to the user appliance. The admonition to minimize power consumption when a portion of the user appliance itself is used is not quite as stringent but is, still, in effect. Additionally still, in spite of the low use of power, the need is for the communication to be extremely reliable so that an alarm sounds when the user appliance goes outside a predetermined range of the device that is carried by the person, and conversely, refrains from sounding when the user appliance is within the predetermined range, even in the presence of interference.

For purposes of exposition, the following illustrative embodiment comprises a transmitter device that is permanently attached, e.g., glued, to the user appliance, and the alarm-sounding device is a receiver that is worn by the user. As the above suggests, the transmitter device might be embedded in and be a part of the appliance. Also as the above suggests, it may be that receiver device that is permanently attached to the user appliance.

The need to consume as little power as possible is achieved by the use of technology that requires little power, and by use of the notion that communication between the transmitter and receiver can be in the form of repeated bursts separated by long sleep intervals during which time extremely little power is consumed. That is, the primary objective of this invention can be achieved even when communication takes place for a short duration followed by a long sleep period, as long as communication is re-established within some preselected outside limit, for example, less than 10 seconds. Thus, it is a principle of this invention that both the transmitter and the receiver are mostly off, but "wake up" repeatedly to communicate with each other.

To properly detect a transmission from a given transmitter, the receiver must be turned "on" and it must receive information that identifies the given transmitter (in contradistinction to merely receiving some transmitted power), and the latter means that there cannot be undue interference from another transmitter. Since it is desired to have low power consumption on the part of both the transmitter and the receiver, and that speaks against using elaborate error correction codes because they consume power, that leads to the desire to receive (in contrast to accept) transmissions from interfering transmitters. Fortuitously, it is an objective of this invention to maintain communication between a transmitter and a receiver that are physically close to each other, so the desire to not receive transmissions from interfering transmitters is achieved with a receiver that hase only a limited reception range.

Use of an insensitive receiver is a good partial solution because an insensitive receiver can employ a simple design, and simpler designs typically are smaller in size and have lower power consumptions than sophisticated, complex, designs; and that also advances the other objectives of this invention. Still, one must be concerned with the possibility of having a number of transmitter/receiver pairs in close proximity to each other, and the consequent possible interferences that might arise (e.g., a number of users on a crowded train employ such transmitter/receiver pairs). Stated differently, one has to be concerned that when the transmitters of two transmitter/receiver pairs that are physically close to each other collide, in the sense of transmitting a burst at the same time, their receivers fail to properly receive the transmissions.

One solution is to have the transmitter/receiver pairs be selective as to the carrier frequency. However, since the allowed frequency band in which such pairs may operate is limited by government regulations, reliance on frequency discrimination leads to a requirement of very high selectivity by the receiver, very high frequency stability by the transmitter and synchronization issues, and that leads to very complex power consuming devices (particularly in the receivers).

One first blush a solution exits in the well-known time division multiplexing approach. According to such an approach, all manufactured transmitter/receiver pairs are limited to one carrier frequency, and all communicate during specified, different, time slot of a fixed common frame having a selected number of time slots. Alas, this requires all of the transmitters to be synchronized to each other, which is not practical in the instant case. While this is a possible solution for not only tracking one device but also for tracking multiple devices, it cannot be used where there are multiple independent systems in the same locale, and additionally (as mentioned above) it has the disadvantage of requiring synchronization between the multiple transmitters.

Another solution is to have each transmitter/receiver pair use a frame with a distinct number of slots. However, two transmitters that have A and B number of time slots in a frame, respectively, will collide (i.e., transmit in the same time slot) every AB frames if A and B are prime numbers, and more often otherwise. A lower limit on the number of time slots is driven by the desire to have the transmitter/receiver pair consume little power (a small number of time slots corresponds to a larger duty cycle and higher power consumption) and an upper limit on the number of time slots is driven by the time before an alarm sound.

We realized that a superior solution is to have each transmitter transmit a repeated sequence comprising a short burst followed by a sleep interval, but unlike the TDM approach, the sleep intervals change with each repeated sequence thereby forming a sleep intervals pattern of other than uniform sleep intervals.

In accordance with this approach, each transmitter employs a sleep intervals pattern that is selected from a set of acceptable sleep patterns. Illustratively, an acceptable sleep intervals pattern for a first transmitter is one that contains no pair of adjacent sleep intervals that is also found in the pattern of any of the other transmitters (in preserved order) that might possibly be physically proximate to the first transmitter. To illustrate, a first transmitter may have a sleep intervals pattern of: 8999, 8833, 8729, 8903, 8944, . . . 8892, 8791 time units, and in accord with the principles disclosed herein no other manufactured transmitter that has a non-insignificant probability of being in close proximity to the first transmitter employs a pattern that includes a sleep interval of 8999 time units followed by a sleep interval of 8833 time units, a sleep a sleep interval of 8833 time units followed by a sleep interval of 8729 time units, or a sleep interval of 8729 time units followed by a sleep interval of 8903 time units, etc. Satisfying this requirement means that a manufactured transmitter that, for example, includes the sleep interval 8833 but not followed by the sleep interval 8729 can have, at most, two consecutive collisions with the above first transmitter (the first by happenstance at the beginning of the two transmitters going to a 8833 time units sleep interval, and the second following the 8833). If an alert is to be provided in no later than 9 seconds after loss of signal, in the presence of a transmitter from another system, then at least 3 transmissions must occur before the end of the 9 seconds, permitting the 2 collision maximum due to the interfering transmitter—which in effect are discounted, and the one subsequent transmission that, if not detected properly, would initiate the alert.

In order to conserve power of both the transmitter and the receiver, it is advisable to have sleep intervals that are many time units in duration for each transmitted/received burst that occupies one time unit. A ratio that is greater than 1 to 6000, for example 1 to 8000, is deemed useful. One beneficial effect of the above-disclosed approach is that the 1 to 8000 ratio does not need to be maintained for all sleep intervals, but rather for the average sleep interval or, if one wishes to be more restrictive, the 1 to 8000 ratio average is maintained over an 9 second time interval.

One acceptable arrangement is to have a time unit during which a burst is transmitted have 48 bits that are transmitted at 128 Kb/s rate. That corresponds to a burst that is 3/8 ms. A sleep interval of 7999 time units plus 1 time unit for the burst thus occupy 3 seconds.

It can be shown that if a sleep interval sequence of K sleep intervals (not necessarily distinct) is taken from a set of N sleep intervals and the sequence is circular, with a requirement that no two sequences have a pair of numbers that can be found in another sequence, the number of different such sequences is $$\frac{N^2}{2}.$$

If N is 4000 (sleep intervals in the range between 6000 and 10,000 time units—average of 8000 time units), the number of acceptable sequences is 16 million.

It should be realized that the above-disclosed solution is absolutely foolproof from the stand point of multiple consecutive collisions as long as the number of manufactured system is 16 million or less, but in reality it should be realized that the likelihood of an actual occurrence of a multiple consecutive collisions is very small indeed even when two systems employ the same sleep intervals pattern. The likelihood that two such transmitters are physically close enough to a receivers is also infinitesimally small; and that likelihood can be reduced even further by, for example, manufacturing the first 16 million systems for use in the US, the next 16 million systems for use in Japan, etc.

It is noted that acceptable sequences can be chosen in accord with a different requirement, such as sequences that share not more than a doublet of sleep intervals.

Thus, in accordance with one of the invention features disclosed herein, each manufactured transmitter/receiver unit is provided with a unique pattern of sleep intervals which, for example, is pre-stored in respective memories of the transmitter/receiver pair. In a cooperative manner, the transmitter outputs a burst and the receiver receives the burst. They both then go to sleep for a time interval dictated by the sleep interval pattern, wake up, and repeat the transmission and reception function.

When a receiver is time synchronized to the transmitter, it knows when to “wake up” in anticipation of a transmitted burst. It therefore wakes up in time, receives a burst, identifies the transmitter by an ID extracted from the burst, confirms reception of a burst from the proper transmitter, obtains a next sleep interval from its memory, and goes back to sleep for the duration specifies by the obtained sleep interval. This cycle is repeated, and as long as the communication is successful, the assumption is made that the user appliance to which the transmitter is attached (or is a part thereof) is in close physical proximity to the receiver. It is noted that such synchronized operation does not require a clock within the receiver to be precisely synchronized with a corresponding clock within the transmitter.

When, however, the receiver is not synchronized to the transmitter—a state that exists at least at first “turn on,” in accord with the principles disclosed herein the receiver is caused to remain awake until it receives a burst from a proper transmitter within a predetermined time interval, at which time the receiver reverts to its normal sleep/awake pattern of operation. If a proper burst is not received within a predetermined time interval (9 seconds in the considerations discussed above), the receiver outputs an alarm.

It is noted that, in the course of acquiring synchronization, when the receiver detects a burst from the expected transmitter, i.e., from a transmitter that sends the proper ID, absent other information the receiver is still unable to synchronize, because it does not know what is the next scheduled sleep interval. To address the need to synchronize, the burst includes a field that specifies the position in the sequence of sleep intervals. Thus, for example, when the first transmitter sends a sequence number 3, and the sleep intervals pattern is 8999, 8833, 8729, 8903, 8944, . . . 8892, 8791, then the receiver knows that the next sleep interval will be 8792 time units long. Armed with this knowledge, the receiver can “go to sleep” and wake up in anticipation of the next burst, 8792 time units later.

Based on the above, it is clear that at least one piece of information needs to be communicated with each burst: information pertaining to the a sleep interval (such as an index that points to the next sleep interval), and information about the transmitter’s identify. To provide for reliable reception of this information, the burst also includes a preamble pattern of bits that includes a start pattern. This conventional approach allows the receiver to know precisely when the data is being transmitted, as well as set the proper level for the slicer within the receiver, which differentiates between the 1’s and the 0’s in the data stream.

Illustratively, the packet that is transmitted during each burst include a preamble field that employs 16 bits, an ID field that employs 16 bits, and a sleep interval sequence number that employs 16 bits, for a burst total of 48 bits.

The transmitter, shown in FIG. 1, is extremely simple. Its function is to every so often output a short burst that carries the above-described packet. This is achieved with a single chip Amplitude Shift Keying (ASK) transmitter 12 that includes “enable” port 11. Whenever a “1” is applied to port 11, transmitter 12 outputs a carrier signal, whereas when a “0” is applied to port 11, transmitter 12 outputs nothing and is in a low power consumption mode. Controller 10 drives transmitter 12 via the enable port, and ROM 14 is coupled to controller 10, from whence the controller obtains the transmitter’s unique sleep intervals pattern. For example, transmitter 12 may be realized by the TDA5102 integrated circuit offered by Infineon Technologies, and controller 10 may be realized by the low power 16-bit RISC controller MSP430F1101A offered by Texas Instrument.

In accord with one embodiment, controller 10 includes an oscillator 101 that develops a 128 KHz clock that is used to apply bits to enable port 11, and effectively counter 102 that divides the 128 KHz clock by 48 to develop a time-unit clock 17. Down counter 103 is driven by the time-unit clock, and when counter 103 reaches 0 it gates the 128 KHz clock to register 105, which applies its contents (that is being shifted out by the 128 KHz clock) to port 11. Concurrently, address counter 104 is advanced, and the next sleep interval (in time units) is fetched from a ROM 14 location addressed by counter 104, and loaded into down counter 103 with the next time-unit clock. At some convenient time while down counter 103 is not at 0, register 105 is loaded with the information that a burst should contain; that is, the burst’s preamble, the transmitter’s ID, and the address value of counter 141.

It may be noted that the time-unit clock does not have to be derived from the 128 KHz clock (as long as it is not faster than the 128 KHz clock divided by 48).

The receiver is more complex because it needs to receive, maintain synchronization with the transmitter, and make decisions. Specifically, it needs to turn “on” just prior to when the burst is expected to be received, it needs to be “on” only when a burst is expected, and it needs to condition itself for optimized detection. The receiver also needs to deal with the non-reception of an expected burst, or a plurality of bursts, and to re-synchronize itself with the transmitter after loss of a plurality of bursts (alarm condition) as well as on initial turn-on.

Figure 2:
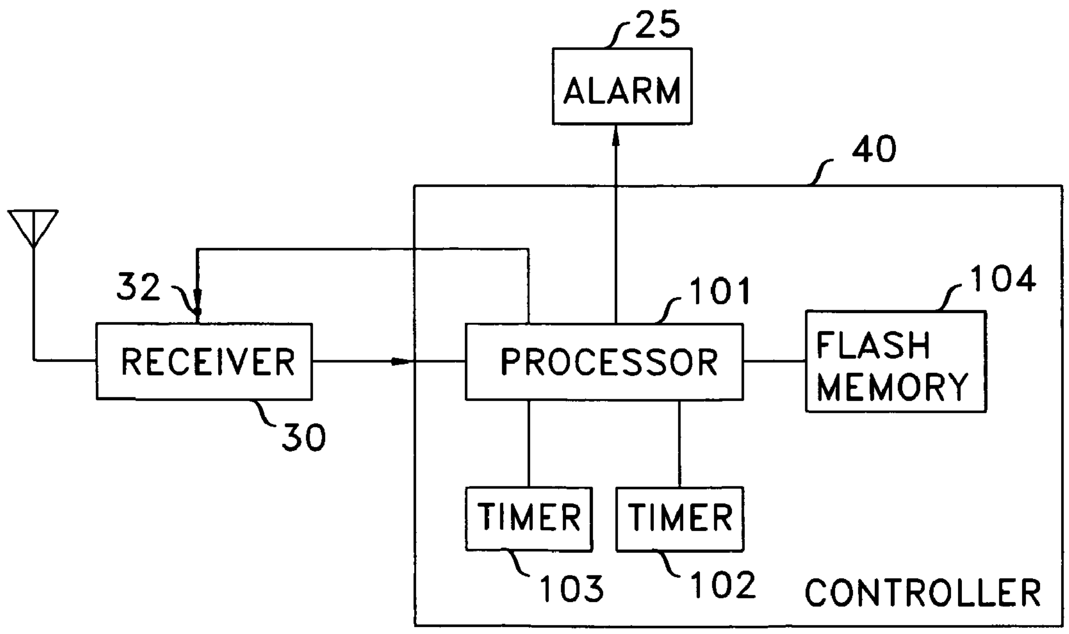
FIG. 2 presents a block diagram of a receiver in accord with the principles disclosed herein.

FIG. 2 presents a block diagram of a receiver in accord with the principles disclosed above, where receiver 30 outputs its received (and demodulated) signal to controller 40. Receiver 30 may be a purchased integrated circuit, such as the TDA5212 receiver manufactured by Infineon Technologies. Controller 40 may be a programmed microprocessor that feeds an alarm-sounding element 25 and also turns "on" and "off" receiver 30 via port 32. Controller 40 includes a RAM for storing programs and alterable data and a ROM that is addressed by a counter B, and illustratively performs the functions enumerated above in the manner outlines by the flowchart of FIG. 3.

Controller 40 also includes an oscillator that develops a time-unit clock, which is nominally of the same frequency as the time-unit clock of the FIG. 1 transmitter. Decision block 201 determines whether a clock pulse of the time-unit clock arrives, and when it does, control passes to block 202, which decrements a counter A within the controller. Counter A is effectively the sleep interval measuring means. Following the decrementing of counter A, control passes to decision block 203 where a determination is made as to whether counter A reached value 1. As long as counter A is greater than 1, nothing happens, until the next decrementing of counter A. As soon as counter A reaches 1, controller 40 develops a Receiver Enable signal that is at logic level "1" for three time-unit clocks, and communicates that signal to port 32 of receiver 30, which wakes up, or enables, receiver 30, thereby making it operational. The enabling of receiver 30 is made with the expectation that a proper signal will be received sometime about the time one time-unit clock pulse after the receiver is woken up; i.e., when counter A reaches values 0.

Control then passes to block 204 where whatever signal is received at about the expected time is analyzed. Control then passes to block 205, which determines whether the ID contained in the burst (packet) is the ID expected by the receiver. If not, it indicates that the received signal is either from a transmitter that is other than the expected transmitter, or is corrupted by an interfering signal. Whatever the cause, a decision is made to count this as a failure and, accordingly, an Alert register within the controller is incremented by block 211. Control then passes to block 212, where a decision is made as to whether the value within the Alert register is greater than some selected number—in FIG. 3, that number is 3. As long as the value within the Alert register is less than then selected number, nothing happens. When the value within the Alert register reaches the selected number, control passes to, 213, which activates alarm device 25 (FIG. 2), and turns receiver 30 "on" permanently, by setting variable perm-on to logic value "1," which variable is OR'ed with the Receive Enable signal.

The reason for turning receiver 30 "on" permanently is that the alarm condition can correspond to the user's appliance having been removed outside the range of the receiver, to a state of no synchronization (which exists when the system is turned on), or to a loss of synchronization due to a variety of conditions. Stating the goal more explicitly, receiver 30 is turned "on" permanently (rather than for 3 time-unit clock periods between sleep intervals) in an attempt to acquire, or to require, synchronization.

When a valid ID is determined to have been detected in the received packet, control passes from block 205 to block 216 where the value of the Alarm variable is set to 0, and then to block 206 where the value of the perm-on variable is queried. If perm-on is at logic level "0," meaning that operation is normal, control passes to block 210, where counter B is incremented, and thence to block 215 where the ROM within controller 40 is accessed to obtain the next sleep interval. Control, lastly, passes to block 209 where the fetched sleep interval is installed in counter A. If the perm-on variable is at logic level "1," indicating that the received had had no synchronization (but now has received a signal with a valid ID) control passes to block 207, where the perm-on variable is set to "0" (allowing the receiver to wake up and go to sleep according to the dictates of the Receiver Enable signal, and control passes to block 208. Block 208 extracts the sleep interval index from the received burst/packet, and passes control to block 215.

In connection with the analysis performed in block 204, it is noted that the operation is fairly conventional. The preamble string of 1's and 0's is used to develop an appropriate threshold for a slicer, and the pattern of the 1's and 0's in the preamble is also used to identify the precise start of the ID field and the subsequent sleep interval index field.

The receiver arrangement depicted in FIG. 2 can be manufactured to use very little power, thereby allowing the battery that is used to power the receiver to provide service for a long time. However, it is realized that a sensitive receiver such as the above-mentioned TDA5212 requires power to operate the superhetrodyne circuitry (amplification, local oscillator, modulator, etc.), and it is also realized that at times the transmitter is so extremely close to the receiver that a sensitive receiver is not necessary. Rather, one can make do with the most elementary type of receiver where a tuned circuit feeds a diode detector, essentially directly, and such a receiver can be created in hardware to require battery current that is not significantly different from the normal leakage current that batteries experience. An example of a situation when the receiver and transmitter are in extremely close proximity to each other is when both are inside a purse, or a briefcase.

Figure 4:
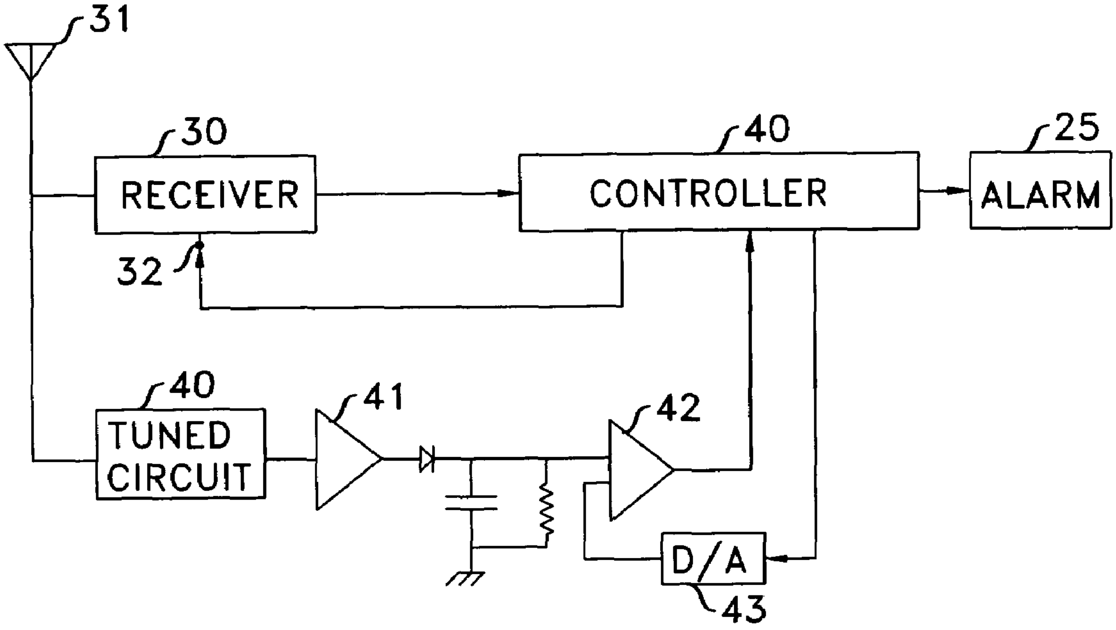
FIG. 4 is a block diagram of a receiver that includes a close proximity receiver module, and an extended distance receiver module.

In accord with another principle disclosed herein, a second illustrative embodiment of a receiver is composed of two receiving blocks: a close proximity receiver, and an extended distance receiver. The extended distance receiver is like the one depicted in FIG. 2 and disclosed above, and the close proximity receiver is created in hardware and arranged to interact with the extended distance receiver. An illustrative block diagram of this arrangement is shown in FIG. 4, where the upper portion is effectively identical to FIG. 2. The lower portion includes tuned circuit 40 that is coupled to antenna 31, and the output of circuit 40 is connected to a diode and a low pass filter (capacitor in parallel with a resistor) via interposed amplifier 41 (presenting a high impedance to the tuned circuit). The output of the low pass filter is applied to comparator 42 (i.e., a "slicer") having a second input that is fed with a reference level from D/A converter 43 that is managed from controller 40. Of course, other embodiments are also possible, such as using different antennas for the two receiver portions.

It is noted that at least some of the operations that are described above as being performed by controller 40 may be performed with hardware; but that is a design choice.

The mode of operation of the FIG. 4 arrangement is as follows: controller 40 is primarily sensitive to the output signal of comparator 42, with receiver 30 turned off (i.e., variable perm-on set to "1." As long as the value of the Alarm variable is below a selected threshold (e.g., 2), operation continues with controller 40 being responsive to the signals provided by comparator 42. As soon as the signal of comparator 42 falls below a chosen threshold, controller 40 sets the perm-on variable to "0," enabling receiver 30 to operate and receive a signal, and thereafter controller 40 is responsive to the signal of receiver 30—as long as the signal of comparator 42 remains below the chosen threshold.

The above discloses an arrangement where a receiver is sensitive to a single transmitter that is characterized by a specific, expected, ID in the packet transmitted by the transmitter. It is sometimes desirable to extend the benefits of the arrangement disclosed above to more than one user appliance and, in particular, to the use of a single receiver that is sensitive to the transmitters of a plurality of receivers.

Figure 3:
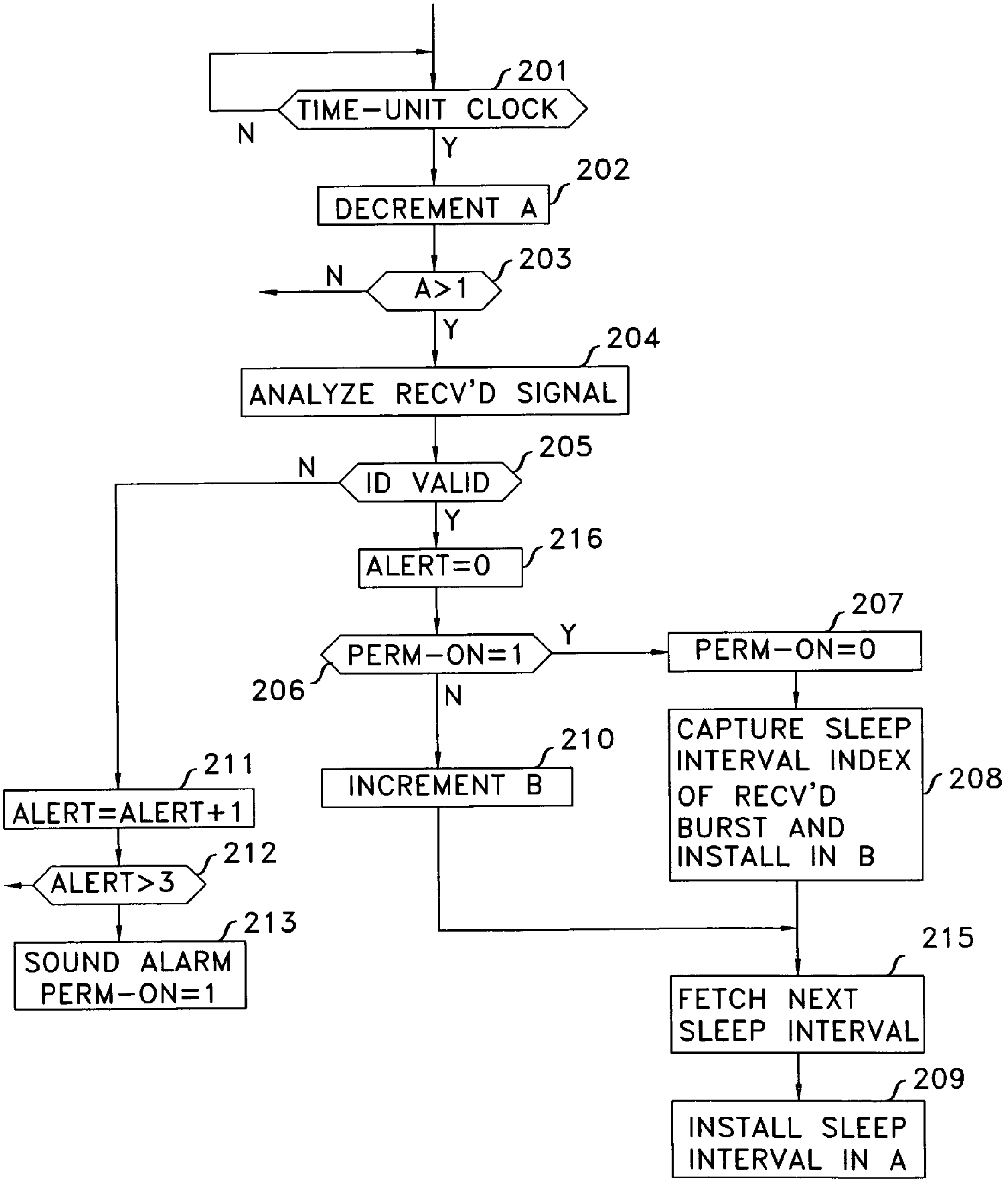
FIG. 3 is flow chart of an illustrative operation of the FIG. 2 receiver.

Such an extension is achieved by having a controller 40 that, effectively concurrently, runs two processes like the one depicted in FIG. 3. That is, the receiver is woken up at a time corresponding to each of the transmitters, and the signal received at each such time (when the receiver is awake) is used to ascertain whether a packet is received that includes the expected ID. Collisions between the sleep interval patterns of the plurality of transmitters that are monitored by the one receiver are not very likely, by virtue of the fact that different sleep interval patterns are not very likely to collide. Nevertheless, it is recognized that all of such transmitters are expected to be with the range of the receiver (in contrast to the almost universal situation where transmitters that are monitored by other receivers will be physically too far to be of any consequence), and increases the likelihood of collisions. However, it is also recognized that the receiver is aware of the sequences of the transmitters which it monitors and, therefore, it can easily recognize and ignore the expected collisions.

In the one transmitter application, when alarm 25 is activated, it is presumed that the user appliance that is being monitored is outside the range of the receiver. However, when an alarm sounds in an arrangement where a plurality of transmitting elements are monitored, it is obviously desirable to know which of the monitored user devices triggered the alarm. To that end, controller 40 includes information that correlates the transmitter IDs with information that is communicated to the user aurally, or through a display (not shown in the FIGS.).

It is noted that the functionality of the transmitter disclosed herein can be incorporated, to a lesser or greater extent, within the user appliance. In the case of cellphones, for example, the cellphone already has a microprocessor, has transmission conditioning circuitry, and has an antenna. In other words, effectively all of the elements shown in FIG. 1 can be embodied within the cellphone. In other appliances, at least the battery of the appliance can be generally used by the transmitter. In yet other appliances, the necessary power might be obtained, or supplemented, with a solar cell; e.g., in a hand-held calculator.

To provide a yet smaller load on the battery of the transmitter, advantage can be taken of the particular mode of handling of some user's appliance. For example, at times a cellphone is carried in cellphone holder that is attached to the belt of the user. In such arrangements, the transmitter that is permanently attached to the cellphone (or is embedded in the cellphone) benefits by having a switch that turns off the battery, and completely disables the transmitter when the cellphone is in the holder. Of course, when a user disables a transmitter it should be expected that the receiver would sound an alarm. Therefore, it is advisable to include a mute button on the receiver. The mute button has the additional benefit of preventing the sounding of an alarm when that is not desirable, such as when the user is at a meeting.

Illustratively, the mute button, once pressed, disables the receiver (and the audible alarm) for a preselected time period, for example 5 minutes. After the 5 minutes expire, the receiver wakes up and attempts to acquire synchronization with the transmitter, or transmitters. If the attempt is unsuccessful, the receiver goes back to sleep for another period of time—such as 6 minutes. This mode of operation continues until synchronization is successful, whereupon the receiver wakes up to normal operation, as if the mute button had not been pressed. Of course, the mute button can be created with two or more positions, with one position turning the receiver "off" until the position of the mute button is changed.

The above discloses various principles and approaches for monitoring one or more user appliances, but it should be realized that various modifications and additions can be incorporated without departing from the spirit and scope of this invention.

For example, a short beep (or similar) can be made to be sounded every time the receiver switches from the close proximity to extended distance receiving mode, and vice versa. This beep provides a confirmation that the system is operational and the batteries are not low.

To give another example, the sleep intervals pattern effectively identifies the transmitter. Therefore, some embodiments may be manufactured without an ID present in the transmitted packet.

Also, an embodiment can be created that operates in reverse manner—with the receiver being attached to the user appliance, and the transmitter being carried by the user. In such an arrangement, the alarm that is sounded by element 25 serves the double function of alerting the user of the fact that the receiver on the appliance is outside the range of the transmitter, and assisting the user in locating the user appliance.

Further, the alarm mentioned above suggests that it is an aural alarm but, of course, that is not a requirement of the invention. A vibrator, or a light might be more desirable in some instances, and they are certainly within the spirit and scope of this invention.

Some situation might arise where, because of interferences, it is advisable to have more power transmitted by the transmitters and have receivers that are correspondingly less sensitive. This is achieved with frequency hopping where the ROM provides both the sleep interval and the carrier frequency information.

The invention claimed is:

1. A receiver that includes a first module for receiving a first signal and coupling a developed signal to a signal-utilization port adapted for connection to an alarm device, characterized by:

said first module includes a port for controlling operational state of the first module, where said operational state of said first module is either active or inactive and where said first module consumes significantly less power when inactive than when active; and a second module for receiving a second signal, where the second module develops a signal and couples the developed signal to said signal-utilization port, and also develops a control signal, which control signal is coupled to said port and causes said first module to be in said inactive state when said second module is successful in receiving said second signal and in said active state when said second module is unsuccessful in receiving said second signal.

2. The receiver of claim 1 where said second module is deemed successful in receiving said second signal when received power of said second signal is above a preselected threshold.

3. The receiver of claim 1 where said first module is only partially turned off when inactive.

4. The receiver of claim 1 where said first module, when enabled, takes significantly more power to operate than the power needed to operate said second module.

5. The receiver of claim 1 where said second signal that is received by said second module is substantially the same as said first signal.

6. The receiver of claim 1 where said second signal that is received by said second module is the same as said first signal.

7. The receiver of claim 1 where said first signal is an electromagnetic signal and said second signal is an electromagnetic signal.

8. The receiver of claim 1 where said first signal arrives via an antenna.

9. The receiver of claim 1 where said second signal arrives via an antenna.

10. The receiver of claim 1 where said first signal and said second signal arrive via a common antenna.

11. The receiver of claim 1 where output signal of said first module and output signal of said second module are applied to said signal-utilization port via switching means.

12. The receiver of claim 1 where said output signal of said first module and output signal of said second module are applied to said signal-utilization port via a controller.

13. The receiver of claim 12 where said controller is a stored program controlled processor.

14. The receiver of claim 1 where said first module comprises a receiving front end applying signals to a stored program controlled processor that outputs a signal to said signal-utilization port, and said second module comprises a series connection of a tuned circuit followed by a detector segment that is to which said processor is responsive.

15. The receiver of claim 14 where said receiving front end is a superhetrodyning receiving stage.

* * * * *